Patented July 3, 1923.

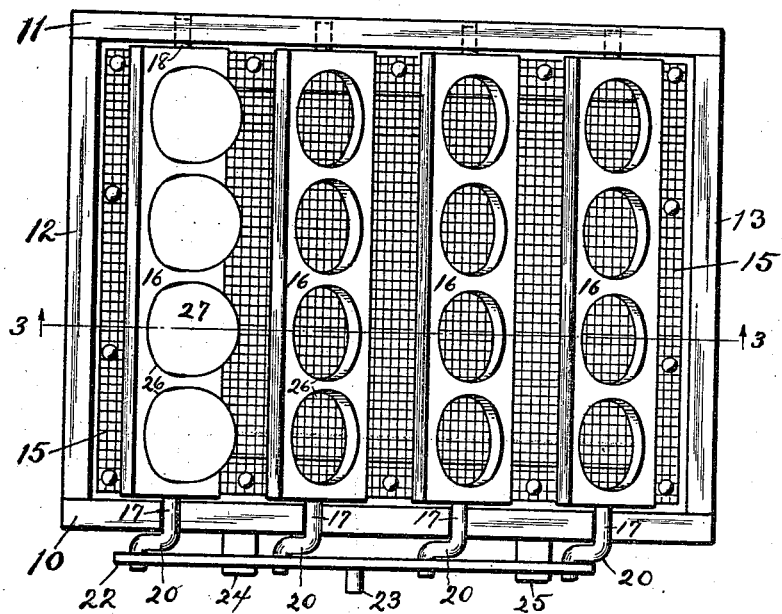
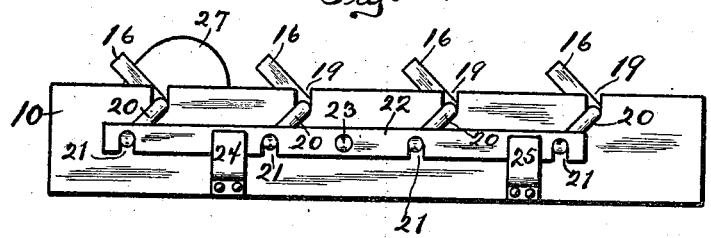
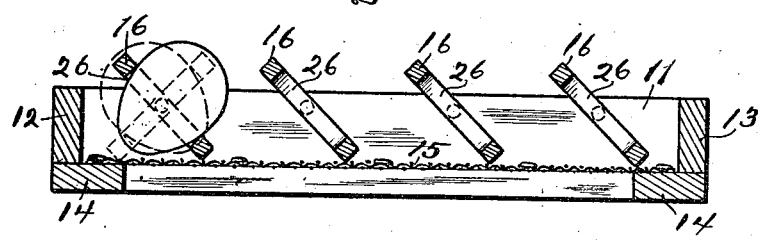

1,460,602

UNITED STATES PATENT OFFICE.

SOLOMON PETERMAN, OF NEVADA, IOWA.

EGG-TURNING ATTACHMENT FOR INCUBATORS.

Application filed April 18, 1922. Serial No. 555,336.

*To all whom it may concern:*

Be it known that I, SOLOMON PETERMAN, a citizen of the United States of America, and resident of Nevada, Story County, Iowa, have invented a new and useful Egg-Turning Attachment for Incubators, of which the following is a specification.

An object of this invention is to provide improved means for turning eggs in an incubator.

A further object of this invention is to provide improved means for supporting eggs in an incubator.

A further object of this invention is to provide an improved construction for an egg-tray.

My invention consists in the construction, arrangement and combination of elements hereinafter set forth, pointed out in the claims and illustrated by the accompanying drawing, in which—

Figure 1 is a plan of an egg-tray embodying my improvements. Figure 2 is a front elevation of the same. Figure 3 is a vertical section on the indicated line 3—3 of Figure 1, dotted lines indicating a reversed position of one of the parts.

In the construction of the device as shown the numerals 10, 11 designate front and rear walls and 12, 13 end walls of a rack or tray. Strips 14 are arranged beneath and support the walls and project inwardly therefrom, and a bottom 15 of wire screen is mounted on said strips between said walls. Slats 16 are arranged side by side and spaced apart between the end walls 12, 13 and extend substantially across the space between the front and rear walls 10, 11, said slats being supported by pivots 17, 18 in said front and rear walls. The pivots 17 are secured to the front ends of the slats and rest in notches 19 in the front wall, while the pivots 18 are secured to rear ends of the slats and are inserted in holes (dotted lines in Fig. 1) in the rear wall. Each of the pivots 17 is formed with a crank 20, in front of the wall 17, and the handles of the several cranks are pivotally received in notches 21 in a floating bar 22 arranged horizontally, parallel with and spaced from said wall 17. A stud 23 is mounted in and projects outwardly from the central portion of the floating bar 22 and serves as a handle therefor. Hooks 24, 25 are mounted on the wall 17 and loosely and partially enclose the floating bar between its ends, thus retaining it on the handles of the cranks. The notches 21 open downwardly, thus permitting the floating bar to be lifted out of the hooks 24, 25 and away from the cranks 20 when it is desired to operate one of the slats separate from the others or to remove one or another of said slats. Each slat 16 is formed with a series of circular holes 26, spaced apart throughout the length of the slat, and each hole 26 is adapted to receive and contain an egg 27, the walls of the holes preferably retaining said eggs with their longest diameters at right angles to the length of the slats.

In practical use the tray slats are loaded with eggs and adjusted, by manipulation of the floating bar, so that said eggs stand with their longest diameters at an angle of about 45 degrees relative to the screen 15. Then the tray is mounted in an incubator or hatching room. At intervals the eggs are turned, that is to say, their upper ends are moved through an arc of about one-fourth of a circle, into the position shown in dotted lines in Figure 3, by reverse manipulation of the floating bar 22; all of the eggs being turned at once by collective oscillation of the several slats 16.

When desired, the floating bar 22 may be removed and the slats be oscillated selectively or removed and the eggs deposited on the screen for hatching, such removal being permitting by the notches 19 in the front wall 11 out of which the pivots 17 may be lifted.

I claim as my invention—

1. An egg-turning attachment for incubators, comprising a tray having a screen bottom, slats mounted for oscillation in said tray and adapted to engage said bottom alternately by their side margins, each tray being formed with egg-carrying seats adapted to hold eggs with their longest diameters at angles to said bottom.

2. An egg-turning attachment for incubators, comprising a tray formed with alining seats in its side walls, slats formed with transverse holes serving as egg seats and also formed with pivots adapted to be loosely mounted in said alining seats, some of said pivots being formed with cranks, a bar formed with notches loosely receiving said cranks, and hooks on the tray loosely embracing said bar.

Signed at Nevada, in the county of Story and State of Iowa, this 5th day of April, 1922.

S. PETERMAN.